United States Patent
Bonrath et al.

(10) Patent No.: US 12,516,020 B2
(45) Date of Patent: Jan. 6, 2026

(54) PROCESS TO PRODUCE SPECIFIC ALPHA,BETA-UNSATURATED CARBOXYLATES

(71) Applicant: DSM IP ASSETS B.V., Heerlen (NL)

(72) Inventors: Werner Bonrath, Kaiseraugst (CH); Estel Canet-Martinez, Kaiseraugst (CH); Roman Goy, Kaiseraugst (CH); Ulrich Hintermair, Bath (GB); Jonathan Alan Medlock, Kaiseraugst (CH); Asad Saib, Bath (GB)

(73) Assignee: DSM IP ASSETS B.V., Maastricht (NL)

( * ) Notice: Subject to any disclaimer, the term of this patent is extended or adjusted under 35 U.S.C. 154(b) by 491 days.

(21) Appl. No.: 18/010,403

(22) PCT Filed: Jun. 8, 2021

(86) PCT No.: PCT/EP2021/065204
§ 371 (c)(1),
(2) Date: Dec. 14, 2022

(87) PCT Pub. No.: WO2021/254811
PCT Pub. Date: Dec. 13, 2021

(65) Prior Publication Data
US 2023/0271920 A1 Aug. 31, 2023

(30) Foreign Application Priority Data
Jun. 19, 2020 (EP) .................................. 20180970

(51) Int. Cl.
| | | |
|---|---|---|
| C07C 403/20 | (2006.01) | |
| B01J 31/22 | (2006.01) | |
| B01J 31/24 | (2006.01) | |
| C07F 15/00 | (2006.01) | |

(52) U.S. Cl.
CPC ......... *C07C 403/20* (2013.01); *B01J 31/2208* (2013.01); *B01J 31/2409* (2013.01); *C07F 15/0053* (2013.01); *B01J 2231/321* (2013.01); *B01J 2531/821* (2013.01); *C07C 2601/16* (2017.05)

(58) Field of Classification Search
CPC .............. C07C 403/20; C07C 2601/16; C07C 403/12; B01J 31/2208; B01J 31/2409; B01J 2231/321; B01J 2531/821; B01J 31/2226; B01J 31/2239; B01J 2231/32; B01J 2531/0216; C07F 15/0053
See application file for complete search history.

(56) References Cited

U.S. PATENT DOCUMENTS

| | | | |
|---|---|---|---|
| 4,766,225 A | 8/1988 | Sayo et al. | |
| 5,395,960 A | 3/1995 | Heider et al. | |
| 2002/0007094 A1 | 1/2002 | Sayo et al. | |
| 2013/0035499 A1* | 2/2013 | Bonomo | ............. C07F 15/0046 556/136 |

FOREIGN PATENT DOCUMENTS

| | | | |
|---|---|---|---|
| CN | 1582273 | 2/2005 | |
| JP | 2002030009 A * | 1/2002 | |
| WO | 03/037856 | 5/2003 | |
| WO | 2020/127158 | 6/2020 | |
| WO | WO-2020127158 A1 * | 6/2020 | ........... C07C 403/12 |
| WO | WO-2020127160 A1 * | 6/2020 | ........... C07C 403/12 |

OTHER PUBLICATIONS

Machine translation of patent No. JP2002030009A, Jan. 29, 2002 (Year: 2002).*
Sigma-Aldrich "Pivalic acid" deposit and available date Jul. 16, 2007 (Year: 2007).*
First Office Opinion Notice, CN Application No. 202180043400.9, May 24, 2024.
Doucet, Henri et al, General Synthesis of (Z)-Alk-1-en-1-yl Esters via Ruthenium-Catalyzed anti-Markovnikov trans-Addition of Carboxylic Acids to Terminal Alkynes, Journal of Organic Chemistry, 1995, 60, 7247-7255.
International Search Report and Written Opinion of the ISA dated Aug. 26, 2021, for PCT/EP2021/065204, 15 pp.
Esther B. Boyar et al., "Complexes of the Platinum Metals. Part 31, 1 Reactions of Binuclear Ruthenium (II,III) and Rhodium (II) Carboxylates with Chelating Diphosphines; X-Ray Crystal Structure of (Acetato-O,O')bis[bis(diphenylphosphino)methane-P,P']ruthenium(II) Tetraphenylborate", Journal of the Chemical Society, Dalton Transactions, Jan. 1, 1986, pp. 1771-1778.
Hans Lehmann et al., "Oxo-centered Trimtheniurn Formate Complexes. Diphosphine Adducts of Oxo-centred Trimthenium Acetates", Journal of the Chemical Society, Dalton Transactions, Jan. 1, 1981, pp. 191-195.

* cited by examiner

*Primary Examiner* — Medhanit W Bahta
(74) *Attorney, Agent, or Firm* — NIXON & VANDERHYE P.C.

(57) ABSTRACT

The present invention relates to a process for producing specific α,β-unsaturated carboxylates.

21 Claims, No Drawings

PROCESS TO PRODUCE SPECIFIC ALPHA,BETA-UNSATURATED CARBOXYLATES

CROSS-REFERENCE TO RELATED APPLICATION(S)

This application is the U.S. national phase of International Application No. PCT/EP2021/065204 filed Jun. 8, 2021, which designated the U.S. and claims priority to EP 20180970.4 filed Jun. 19, 2020, the entire contents of each of which are hereby incorporated by reference.

The present invention relates to a process for producing specific α,β-unsaturated carboxylates.

The specific α,β-unsaturated carboxylates which are aimed to be produced are represented by the following formula (I)

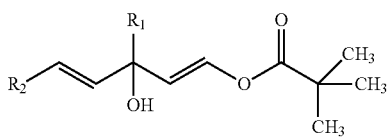

wherein
$R_1$ is a $C_1$-$C_4$-alkyl moiety, preferably —$CH_3$ or —$CH_2CH_3$, and
$R_2$ is

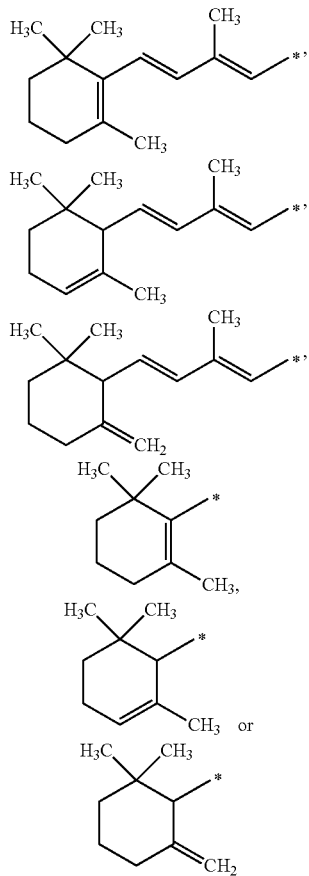

(the * is showing where the bond is localized).

These specific α,β-unsaturated carboxylates are useful compounds. They can be used as such or they are useful intermediates to produce other compounds, such as vitamins (especially Vitamin A acetate (via a reduction followed by an acetylation)).

Therefore due to the importance of such important intermediates, there is always a need for excellent methods of producing such compounds.

The new process to produce these compounds comprises a ruthenium catalyst and mild reaction conditions.

The process to produce these compounds is the following:
a compound of formula (II)

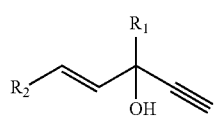

is reacted with a compound of formula (III)

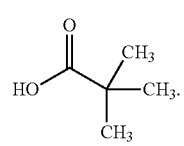

wherein the $R_1$ and $R_2$ have the same meanings as defined above for the compound of formula (I)
in the presence of at least one catalyst of formula (IV)

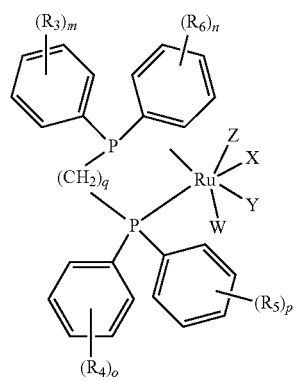

wherein
$R_3$, $R_4$, $R_5$ and $R_6$ signify independently from each other —$CH_3$, —$OCH_3$, —$NO_2$ or halogen, and W, X, Y and Z signify independently from each other a neutral or ionic ligand, wherein W, X, Y and Z can be monodentate or bidentate with the proviso that the Ru is always six times coordinated, and
m, n, o and p signify an integer 0, 1, 2 or 3
q signifies an integer 1, 2, 3 or 4.

The catalyst is always electronically neutral. Furthermore it is obvious that when one or two of the ligands W, X, Y or Z are bidentate, then only three or two ligands are present.

After the termination of the reaction (1st cycle) the catalyst of formula (IV) has been transformed into the following form of formula (IV'), (IV'') and/or (IV''')

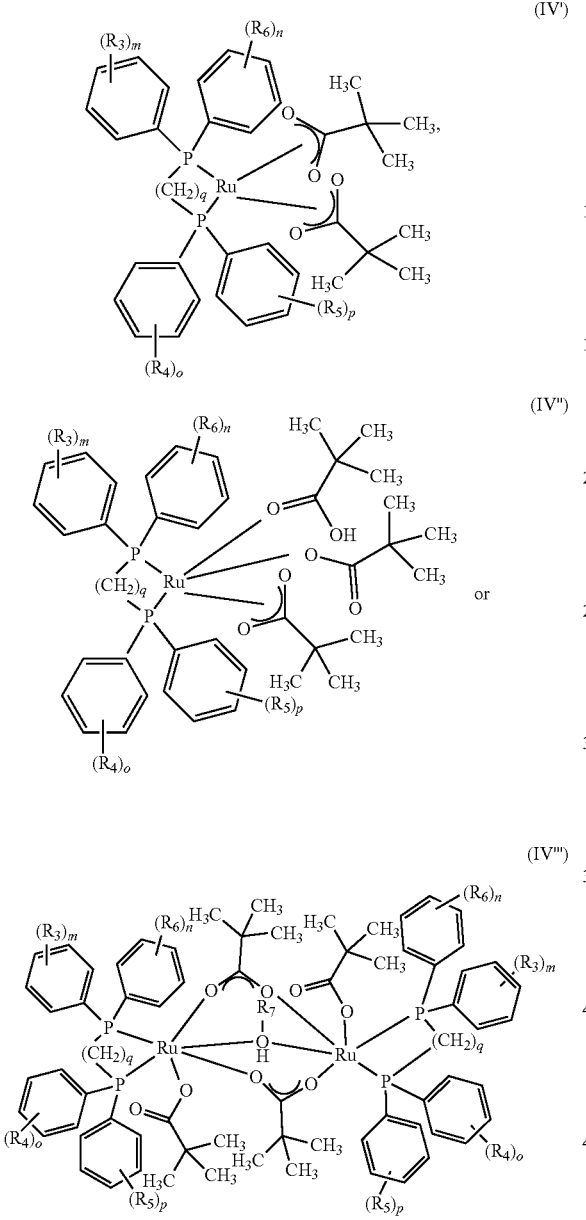

wherein all substituents have the same meanings as defined above and wherein $R_7$ is H or $C_1$-$C_4$ alkyl moiety.

The compounds of formulae (IV'), (IV") and (IV''') are new.

Therefore the present invention relates to a process (P) for the production of a compound of formula (I)

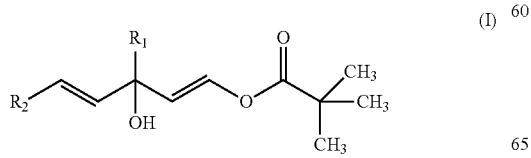

wherein $R_1$ is a $C_1$-$C_4$-alkyl moiety, preferably —$CH_3$ or —$CH_2CH_3$, and $R_2$ is

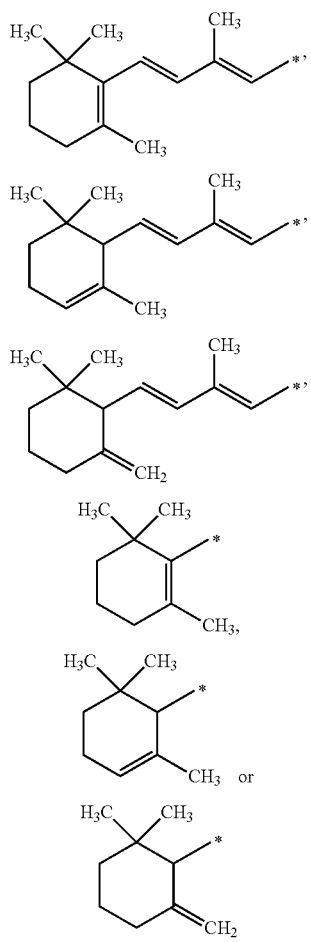

(the * is showing where the bond is localized), and wherein a compound of formula (II)

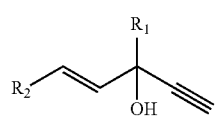

is reacted with a compound of formula (III)

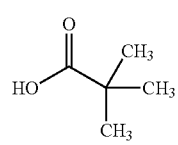

wherein the $R_1$ and $R_2$ have the same meanings as defined above for the compound of formula (I)

in the presence of at least one catalyst of formula (IV)

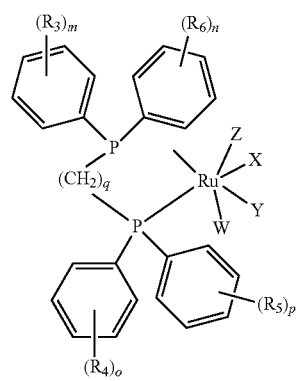

(IV)

wherein $R_3$, $R_4$, $R_5$ and $R_6$ signify independently from each other —$CH_3$, —$OCH_3$, —$NO_2$ or halogen, and W, X, Y and Z signify independently from each other a neutral or ionic ligand, wherein W, X, Y and Z can be monodentate or bidentate with the proviso that the Ru is always six times coordinated, and m, n, o and p signify an integer 0, 1, 2 or 3 q signifies an integer 1, 2, 3 or 4.

Preferred are compounds of formula (I), wherein $R_1$ is —$CH_3$ or —$CH_2CH_3$.

Therefore the present invention relates to a process (P1), which is process (P), wherein $R_1$ is —$CH_3$ or —$CH_2CH_3$.

Preferred are compounds of formula (I), wherein $R_2$ is

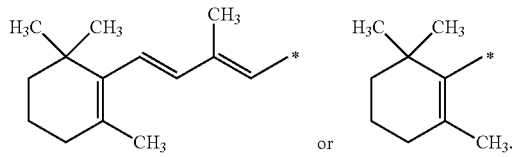

Therefore the present invention relates to a process (P2), which is process (P) or (P1), wherein $R_2$ is

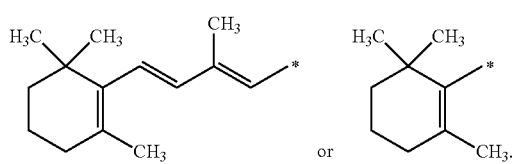

Most preferred are the compounds of formula (Ia) and (Ib)

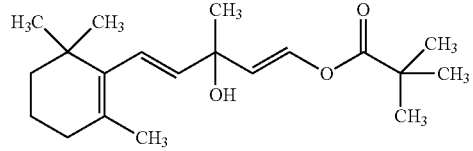

(Ia)

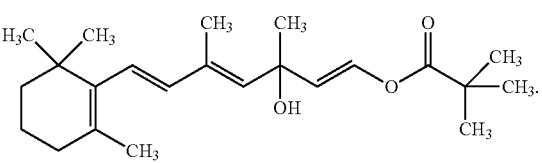

(Ib)

A very preferred catalyst is the one of formula (IVa), (IVb) or (IVc)

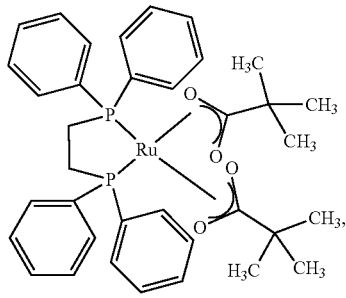

(IVa)

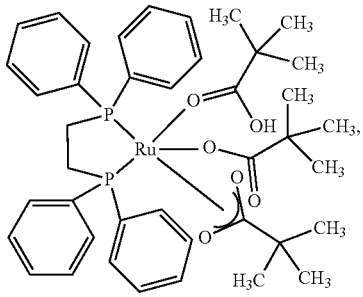

(IVb)

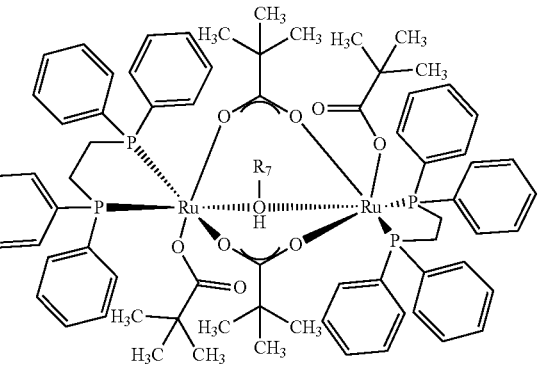

(IVc)

wherein $R_7$ is H or $CH_3$.

Therefore the present invention relates to a process (P3), which is process (P), (P1) or (P2), wherein the catalyst of formula (IVa)

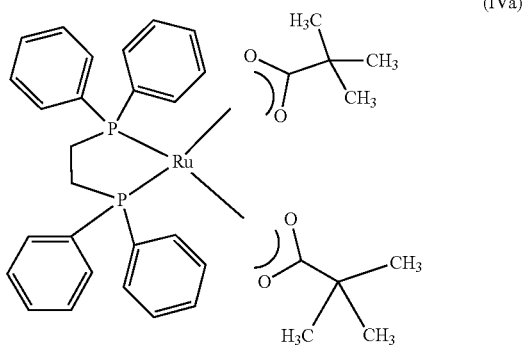

is used.

Therefore the present invention relates to a process (P3'), which is process (P), (P1) or (P2), wherein the catalyst of formula (IVb)

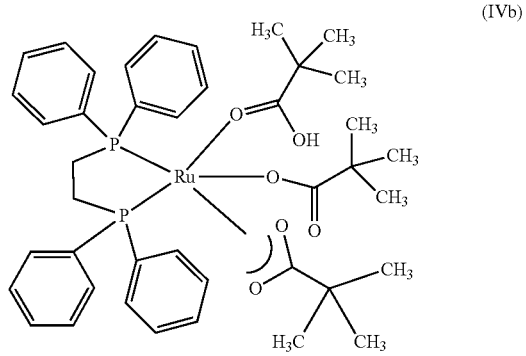

is used.

Therefore the present invention relates to a process (P3"), which is process (P), (P1) or (P2), wherein the catalyst of formula (IVc)

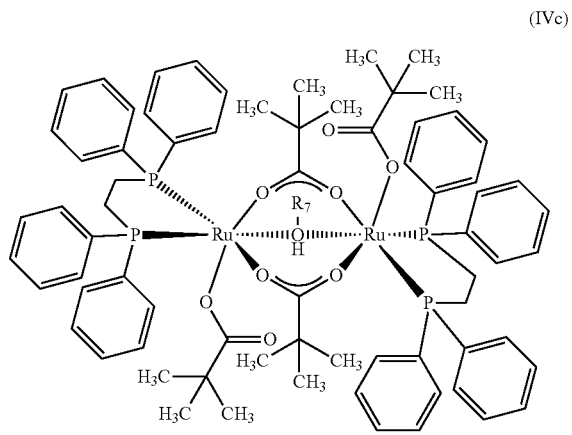

wherein $R_7$ is H or $CH_3$
is used.

The substrate (starting material) to catalyst ratio (mol-based) is usually from 5000:1 to 10:1, preferably from 1000:1 to 20:1.

Therefore the present invention relates to a process (P4), which is process (P), (P1), (P2), (P3), (P3') or (P3"), wherein the substrate (starting material) to catalyst ratio (mol-based) is 5000:1 to 10:1.

Therefore the present invention relates to a process (P4'), which is process (P), (P1), (P2), (P3), (P3') or (P3"), wherein the substrate (starting material) to catalyst ratio (mol-based) is 1000:1 to 20:1.

The process according to the present invention is carried out without any solvents or in at least one apolar aprotic organic solvent.

As solvents there can be used in the scope of the present invention in general apolar aprotic organic solvents, especially aliphatic, cyclic and aromatic hydrocarbons, such as, for example, $C_7$-$C_{10}$-alkanes, $C_5$-$C_7$-cycloalkanes, benzene, toluene and naphthalene as well as mixtures of such solvents with one another, e.g. paraffin oil (a mixture of saturated aliphatic hydrocarbons). As well as carboxylate esters, such as ethyl acetate.

Therefore the present invention relates to a process (P5), which is process (P), (P1), (P2), (P3), (P3'), (P3"), (P4) or (P4'), wherein the process is carried out without any solvent.

Therefore the present invention relates to a process (P6), which is process (P), (P1), (P2), (P3), (P3'), (P3"), (P4) or (P4'), wherein the process is carried out in at least one apolar aprotic organic solvent.

Therefore the present invention relates to a process (P6'), which is process (P), (P1), (P2), (P3), (P3'), (P3"), (P4) or (P4'), wherein the apolar aprotic organic solvent is chosen from the group consisting of aliphatic hydrocarbons, cyclic hydrocarbons aromatic hydrocarbons and carboxylate esters.

Therefore the present invention relates to a process (P6"), which is process (P6'), wherein the apolar aprotic organic solvent is chosen from the group consisting of $C_7$-$C_{10}$-alkanes, $C_5$-$C_7$-cycloalkanes, benzene, toluene, naphthalene, paraffin oil and ethyl acetate.

The process according to the present invention is usually carried out under very mild reaction condition. The reaction temperature is usually between −5° C. and 60° C. Preferably between 0° and 50° C. More preferably between 5° and 45° C. Most preferably between 5° and 40° C.

Therefore the present invention relates to a process (P7), which is process (P), (P1), (P2), (P3), (P3'), (P3"), (P4), (P4'), (P5), (P6), (P6') or (P6"), wherein the process is carried out at a temperature of between −5° C. and 60° C.

Therefore the present invention relates to a process (P7'), which is process (P), (P1), (P2), (P3), (P3'), (P3"), (P4), (P4'), (P5), (P6), (P6') and (P6"), wherein the process is carried out at a temperature of between 0° and 50° C.

Therefore the present invention relates to a process (P7"), which is process (P), (P1), (P2), (P3), (P3'), (P3"), (P4), (P4'), (P5), (P6), (P6') or (P6"), wherein the process is carried out at a temperature of between 5° and 45° C.

Therefore the present invention relates to a process (P7'''), which is process (P), (P1), (P2), (P3), (P3'), (P3"), (P4), or (P4'), (P5), (P6), (P6') or (P6"), wherein the process is carried out at a temperature of between 5° and 40° C.

All reactants are added together and mixed. The reaction mixture is heated to the temperature at which the transition metal-based catalytic rearrangement reaction occurs, to provide a resulting mixture.

Furthermore, the addition of pivalic acid anhydride, compound of formula (V)

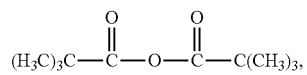
(V)

can be added to the reaction mixture.

The pivalic acid anhydride can be added in amount of 0.01-0.75 mol equivalent (in regard of compound of formula (II)), preferably, 0.05-0.4 mol equivalent (in regard of compound of formula (II)), 0.1-0.25 mol equivalent (in regard of compound of formula (II)).

Therefore the present invention relates to a process (P8), which is process (P), (P1), (P2), (P3), (P3'), (P3"), (P4), (P4'), (P5), (P6), (P6'), (P6"), (P7), (P7'), (P7") or (P7'''), wherein the compound of formula (V)

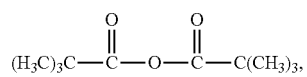
(V)

is added to the reaction mixture.

Therefore the present invention relates to a process (P8'), which is process (P8), wherein the compound of formula (V) is added in amount of 0.01-0.75 mol equivalent (in regard of compound of formula (II)).

Therefore the present invention relates to a process (P8"), which is process (P8), wherein the compound of formula (V) is added in amount of 0.05-0.4 mol equivalent (in regard of compound of formula (II)).

Therefore the present invention relates to a process (P8'''), which is process (P8), wherein the compound of formula (V) is added in amount of 0.1-0.25 mol equivalent (in regard of compound of formula (II)).

After the reaction the catalyst (compound of formula (IV'), (IV") and (IV'''))

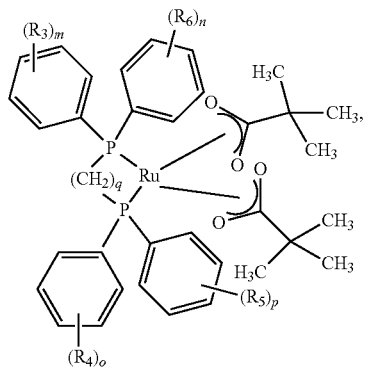
(IV')

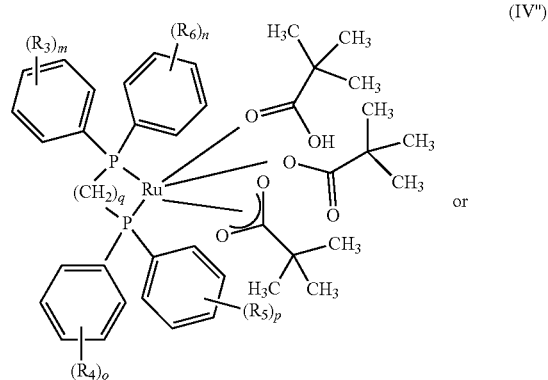
(IV")

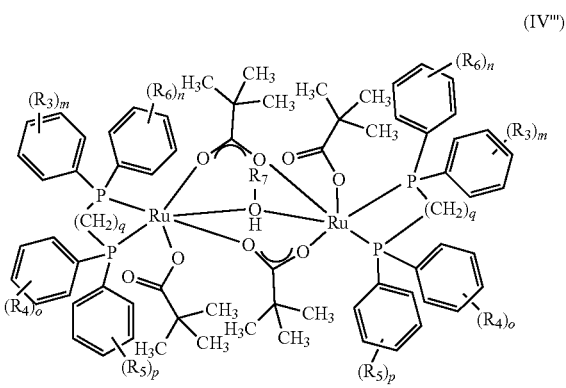
(IV''')

wherein all substituents have the same meanings as defined above can be isolated by commonly known methods.

Furthermore, the catalyst of formula (compound of formula (IV'), (IV") and (IV'''))

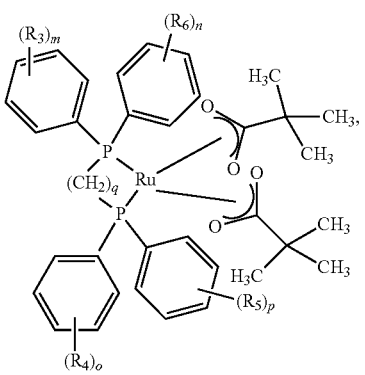
(IV')

-continued

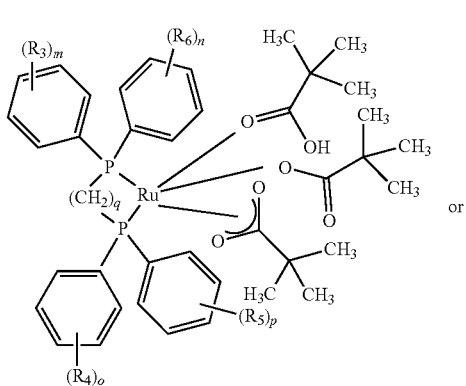

(IV''')

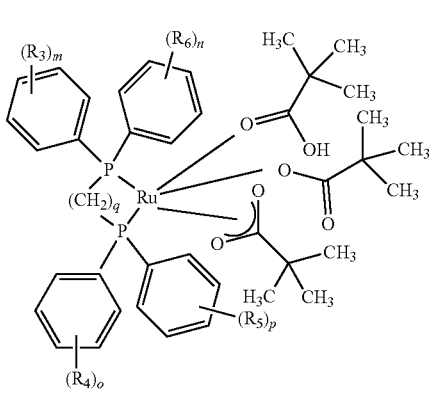

(IV''')

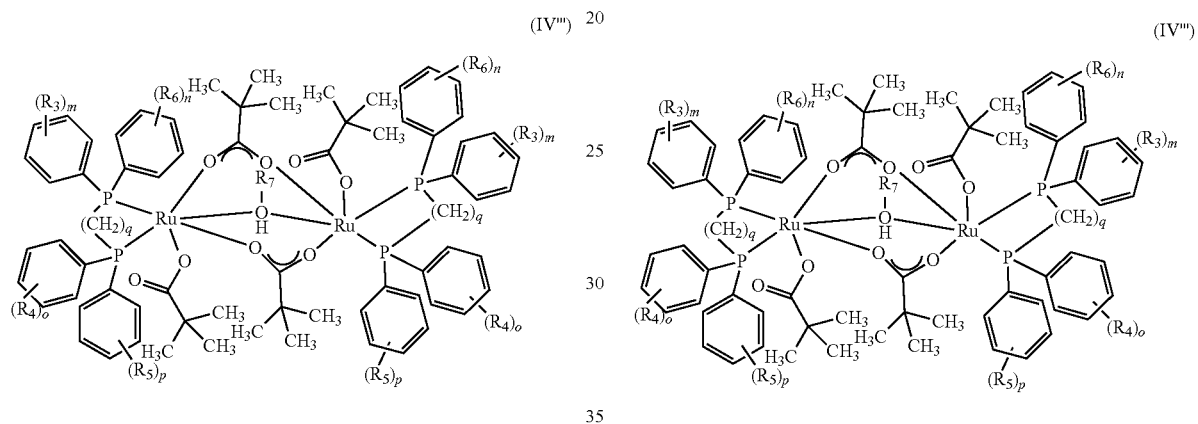

wherein

R$_3$, R$_4$, R$_5$ and R$_6$ signify independently from each other —CH$_3$, —OCH$_3$, —NO$_2$ or halogen, and W, X, Y and Z signify independently from each other a neutral or ionic ligand, wherein W, X, Y and Z can be monodentate or bidentate with the proviso that the Ru is always six times coordinated, and m, n, o and p signify an integer 0, 1, 2 or 3 q signifies an integer 1, 2, 3 or 4, are new.

Therefore, another embodiment of the present invention are the compounds of formulae (IV'), (IV'') and (IV''')

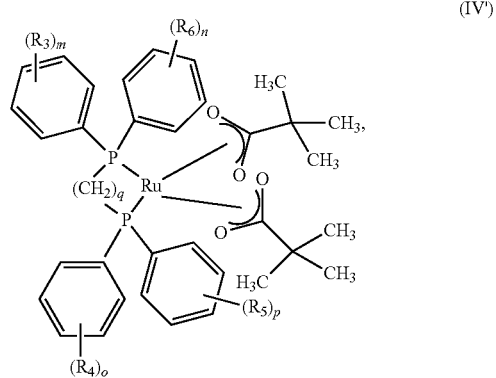

(IV')

wherein

R$_3$, R$_4$, R$_5$ and R$_6$ signify independently from each other —CH$_3$, —OCH$_3$, —NO$_2$ or halogen, and W, X, Y and Z signify independently from each other a neutral or ionic ligand, wherein W, X, Y and Z can be monodentate or bidentate with the proviso that the Ru is always six times coordinated, and m, n, o and p signify an integer 0, 1, 2 or 3 q signifies an integer 1, 2, 3 or 4.

Preferred compounds of formulae (IV'), (IV'') and (IV''') are the compounds of formulae (IVa), (IVb), (IVc') and (IVc'')

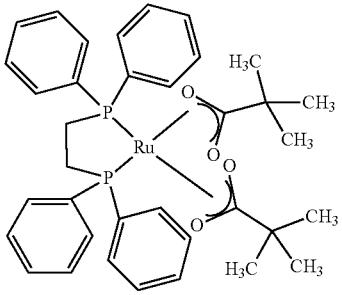

(IVa)

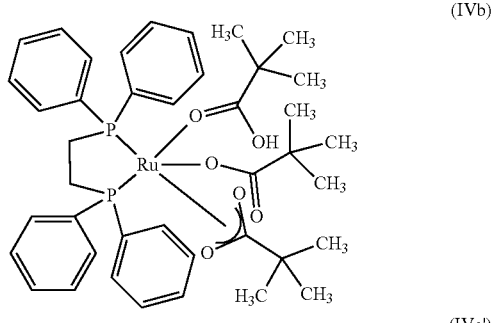

(IVb)

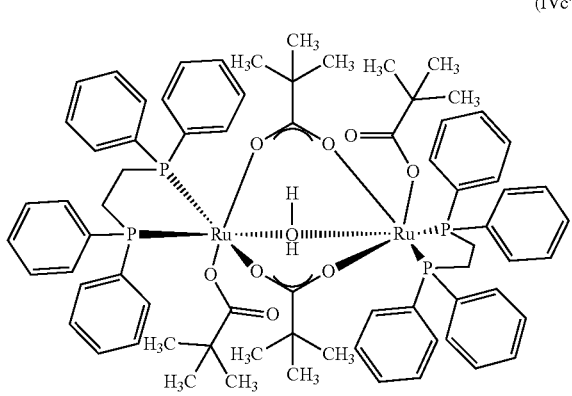

(IVc')

The following Example illustrates the invention further without limiting it. All percentages and parts, which are given, are related to the weight and the temperatures are given in ° C., when not otherwise stated.

EXAMPLES

Example 1

3-Methyl-1-(2,6,6-trimethylcyclohex-1-en-1-yl)pent-1-en-4-yn-3-ol (2.33 g, 10 mmol) and 2,2-dimethylpropanoic acid (1.53 g, 15 mmol, 1.5 eq.) were dissolved in anhydrous ethyl acetate (10 mL) under argon atmosphere. In a counter flow of argon, 61 mg (0.1 mmol, 1.0 mol %) of the [(dppe)Ru(2-methylallyl)$_2$] were added, which formed the catalyst of formula (IVa). After stirring for 24 h at 20° C., the light yellow-brown reaction mixture was concentrated under reduced pressure (rotavap, 20° C. water-bath temperature). The crude product was dried for another 2 h at 20 mbar resulting in a light brown oil. The product of formula (Ia)

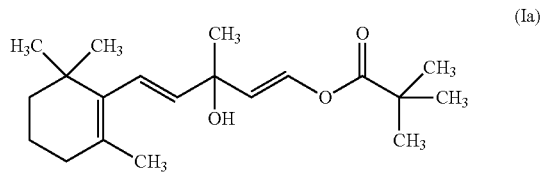 [SMILES: CC1=C(/C=C/C(C)(O)/C=C/OC(=O)C(C)(C)C)C(C)(C)CCC1]

(Ia)

is obtained in a yield of 99%.

In the following table more compounds of formula (Ia) have been produced by the same way as in Example 1. Other reaction times and/or the reaction temperature and/or the amount of ethyl acetate (solvent) have been varied.

| carboxylic acid (compound of formula (III)) | T [° C.] | t [h] | amount of ethyl acetate [mL] | Yield carboxylate [%] |
|---|---|---|---|---|
| 2,2-dimethylpropanoic acid | 20 | 24 | 10 | >99 |
| | 10 | 24 | 0 | >99 |
| | 20 | 6 | 0 | >99 |
| | 30 | 4 | 0 | >99 |
| | 40 | 2 | 0 | 95 |

Example 2

3-Methyl-1-(2,6,6-trimethylcyclohex-1-en-1-yl)pent-1-en-4-yn-3-ol (2.18 g, 10 mmol), 2,2-dimethylpropanoic acid (1.32 g, 11 mmol) and 2,2-dimethylpropanoic anhydride (0.4 mL, 2 mmol) were dissolved in anhydrous ethyl acetate (10 mL) under argon atmosphere. In a counter flow of argon, a solution of 61 mg (0.1 mmol, 1.0 mol %) of the [(dppe)Ru(2-methylallyl)$_2$] in anhydrous acetone (5 mL) were added, which formed the catalyst of formula (IVa). After stirring for 18 h at 20° C. a conversion of 89% 3-Methyl-1-(2,6,6-trimethylcyclohex-1-en-1-yl)pent-1-en-4-yn-3-ol was observed.

In the following table more compounds of formula (Ia) have been produced by the same way as in Example 3. Other additives and/or solvent have been varied.

| Solvent | T [° C.] | t [h] | Additive | Conversion of formula (II) [%] |
|---|---|---|---|---|
| ethyl acetate | 20 | 18 | — | 81 |
| ethyl acetate | 20 | 18 | 2,2-dimethylpropanoic anhydride (2 mmol) | 89 |
| ethyl acetate | 20 | 18 | H$_2$O (0.5 mol %) | 49 |
| acetone | 20 | 18 | — | 79 |
| acetone | 20 | 18 | 2,2-dimethylpropanoic anhydride (2 mmol) | 85 |

Example 3

2,2-dimethylpropanoic acid (1.0 g, 9.8 mmol) and 60 mg (0.1 mmol) of the ruthenium catalyst of formula (IV) were dissolved in anhydrous ethyl acetate (15 mL) under argon atmosphere. After 0.5 h the solvent was evaporated for 2 hours (40° C.). The remaining solid was dissolved in anhydrous n-hexane at reflux and allowed to cool gradually from 60° C. to −20° C. for yellow sharp crystal formation to obtain the ruthenium catalyst of formula (IVb).

Example 4

2,2-dimethylpropanoic acid (5.0 g, 49 mmol) and 60 mg (0.1 mmol) of the ruthenium catalyst of formula (IV) were dissolved in anhydrous ethyl acetate (10 mL) under argon atmosphere. After 0.5 h the solvent was evaporated for 2 hours (40° C.). The remaining solid was dissolved in acetone and slow diffusion of n-hexane were set up for yellow sharp crystal formation to obtain the ruthenium catalyst of formula (IVc').

The invention claimed is:
1. A process for producing a compound of formula (I):

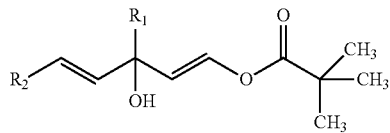   (I)

wherein
$R_1$ is a $C_1$-$C_4$-alkyl moiety, and
$R_2$ is

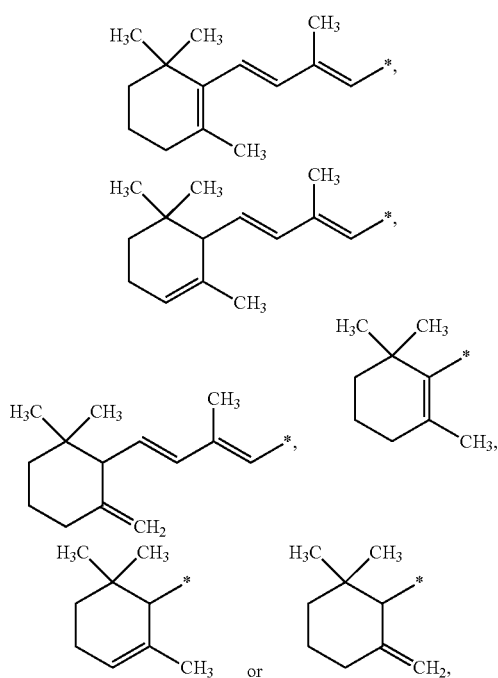

wherein
the symbol * shows a location where the bond is localized, wherein the process comprises:
reacting a reaction mixture comprising a compound of formula (II):

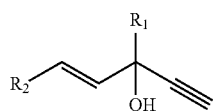   (II)

and a compound of formula (III):

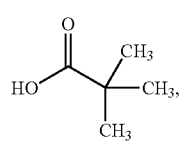   (III)

wherein
$R_1$ and $R_2$ have the same meanings as defined above for the compound of formula (I),
in the presence of at least one catalyst of formulas (IVa), (IVb) and/or (IVc):

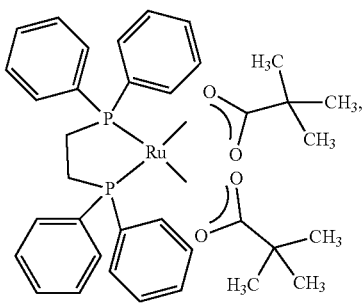   (IVa)

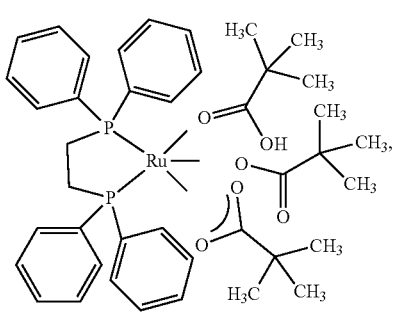   (IVb)

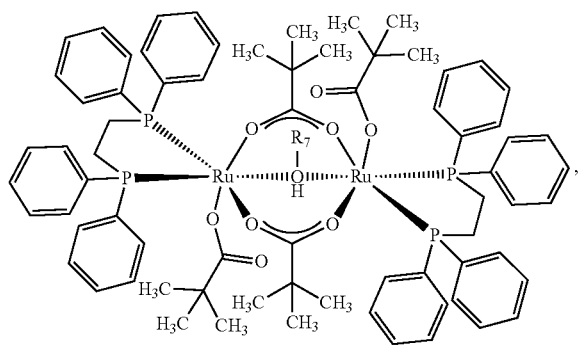   (IVc)

wherein $R_7$ is H or $CH_3$,
to form the compound of formula (I).

2. The process according to claim 1, wherein $R_1$ is —$CH_3$ or —$CH_2CH_3$.

3. The process according to claim 1, wherein $R_2$ is

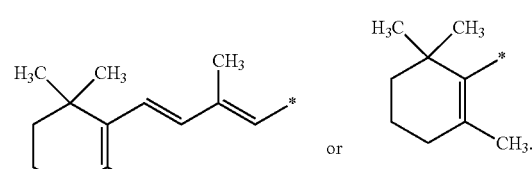

4. The process according to claim 1, wherein the compound of formula (I) is a compound of formula (Ia) or (Ib):

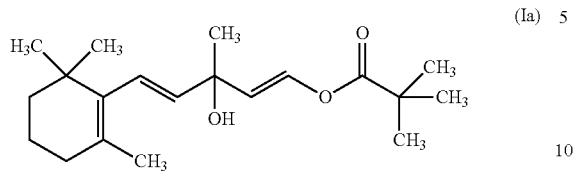

(Ia)

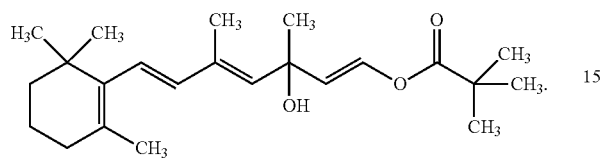

(Ib)

5. The process according to claim 1, wherein a mol-based ratio of the compounds of formulas (II) and (III) in the reaction mixture to the catalyst is 5000:1 to 10:1.

6. The process according to claim 1, wherein the process is carried out in the absence of solvent.

7. The process according to claim 1, wherein the process is carried out in at least one apolar aprotic organic solvent.

8. The process according to claim 7, wherein the at least one apolar aprotic organic solvent is selected from the group consisting of aliphatic hydrocarbons, cyclic hydrocarbons, aromatic hydrocarbons and carboxylate esters.

9. The process according to claim 1, wherein the process is carried out at a temperature of between −5° C. and 60° C.

10. The process according to claim 1, wherein the process comprises adding a compound of formula (V):

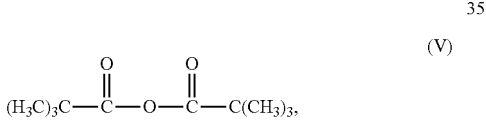

(V)

to the reaction mixture.

11. The process according to claim 10, wherein the compound of formula (V) is added to the reaction mixture in amount of 0.01-0.75 mol equivalent based on the compound of formula (II).

12. A process for producing a compound of formula (I):

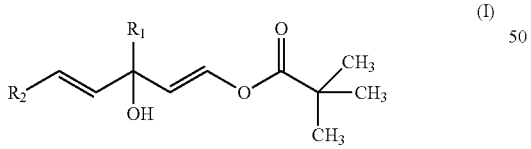

(I)

wherein
$R_1$ is a $C_1$-$C_4$-alkyl moiety, and
$R_2$ is

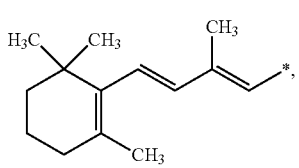

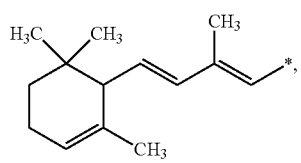

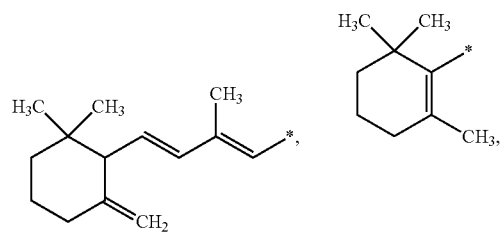

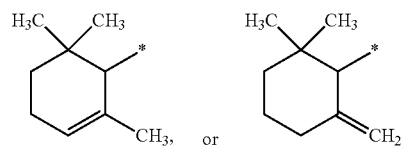

and wherein the symbol * shows a location where the bond is localized, wherein the process comprises reacting a reaction mixture comprising a compound of formula (II):

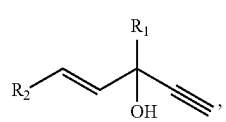

(II)

a compound of formula (III):

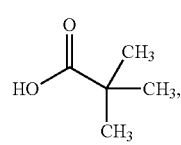

(III)

and a compound of formula (V):

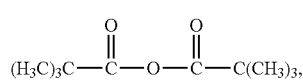

(V)

wherein R₁ and R₂ have the same meanings as defined above for the compound of formula (I),
in the presence of at least one catalyst of formula (IV):

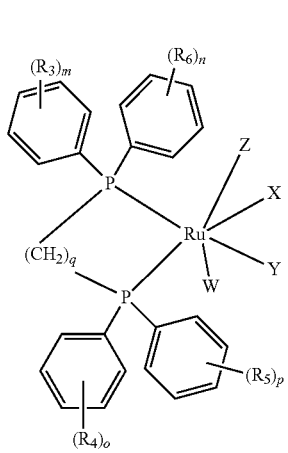

wherein
R₃, R₄, R₅ and R₆ signify independently from each other —CH₃, —OCH₃, —NO₂ or halogen,
W, X, Y and Z signify independently from each other a neutral or ionic ligand, wherein W, X, Y and Z can be monodentate or bidentate with the proviso that the Ru is always six times coordinated,
m, n, o and p signify an integer 0, 1, 2 or 3, and
q signifies an integer 1, 2, 3 or 4.

13. The process according to claim 12, wherein the compound of formula (V) is present in the reaction mixture in an amount of 0.01-0.75 mol equivalent based on the compound of formula (II).

14. The process according to claim 12, wherein R₁ is —CH₃ or —CH₂CH₃.

15. The process according to claim 12, wherein R₂ is

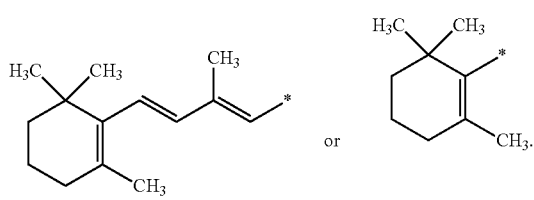

16. The process according to claim 12, wherein the compound of formula (I) is a compound of formula (Ia) or (Ib):

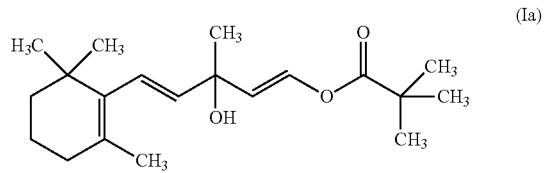

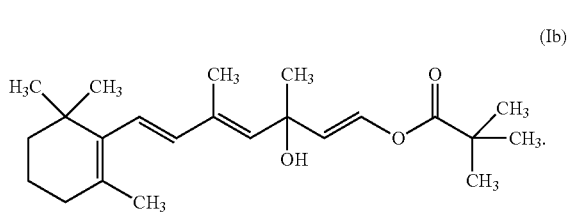

17. The process according to claim 12, wherein a mol-based ratio of the compounds of formulas (II) and (III) in the reaction mixture to the catalyst is 5000:1 to 10:1.

18. The process according to claim 12, wherein the process is carried out in the absence of solvent.

19. The process according to claim 12, wherein the process is carried out in at least one apolar aprotic organic solvent.

20. The process according to claim 19, wherein the at least one apolar aprotic organic solvent is selected from the group consisting of aliphatic hydrocarbons, cyclic hydrocarbons, aromatic hydrocarbons and carboxylate esters.

21. The process according to claim 12, wherein the process is carried out at a temperature of between −5° C. and 60° C.

* * * * *